United States Patent
Di et al.

(10) Patent No.: US 12,222,808 B2
(45) Date of Patent: Feb. 11, 2025

(54) SYSTEM FAULT HANDLING METHOD AND APPARATUS, DEVICE, AND STORAGE MEDIUM

(71) Applicant: SUZHOU METABRAIN INTELLIGENT TECHNOLOGY CO., LTD., Jiangsu (CN)

(72) Inventors: Zhonghui Di, Jiangsu (CN); Dan Liu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/700,774

(22) PCT Filed: Jun. 15, 2022

(86) PCT No.: PCT/CN2022/098944
§ 371 (c)(1),
(2) Date: Apr. 12, 2024

(87) PCT Pub. No.: WO2023/123889
PCT Pub. Date: Jul. 6, 2023

(65) Prior Publication Data
US 2024/0338276 A1   Oct. 10, 2024

(30) Foreign Application Priority Data
Dec. 27, 2021 (CN) .......................... 202111607788.9

(51) Int. Cl.
*G06F 11/07* (2006.01)
*G06F 11/10* (2006.01)
*G06F 11/20* (2006.01)

(52) U.S. Cl.
CPC ...... *G06F 11/1076* (2013.01); *G06F 11/0727* (2013.01); *G06F 11/2097* (2013.01)

(58) Field of Classification Search
CPC ............ G06F 11/1076; G06F 11/1088; G06F 11/1092; G06F 11/0727; G06F 11/0793; G06F 11/3034
See application file for complete search history.

(56) References Cited

U.S. PATENT DOCUMENTS

| | | |
|---|---|---|
| 5,258,984 A | 11/1993 | Menon et al. |
| 2002/0049886 A1* | 4/2002 | Furuya ................ G06F 11/0727 714/6.24 |

(Continued)

FOREIGN PATENT DOCUMENTS

| | | |
|---|---|---|
| CN | 102033716 A | 4/2011 |
| CN | 107220148 A | 9/2017 |

(Continued)

OTHER PUBLICATIONS

PCT/CN2022/098944, International Search Report, Date Mailed Aug. 31, 2022.

(Continued)

*Primary Examiner* — Yolanda L Wilson
(74) *Attorney, Agent, or Firm* — Cooper Legal Group, LLC

(57) ABSTRACT

The present application discloses a system fault handling method and apparatus, a device, and a storage medium. The method includes: dividing disks in RAID based on the number of stripes, then configuring multi-state standby blocks for the stripes, and distributing the multi-state standby blocks on the disks in the RAID, so as to enable the disks to use the multi-state standby blocks to run at the same time to handle faults when the faults occur at the same time; acquiring fault information factors corresponding to fault blocks after faults occur on the blocks, and then storing the fault information factors in stripe block state mapping items in a stripe block state mapping linked list; and selecting corresponding handling strategies based on different stripe (Continued)

block state mapping items, so as to perform corresponding operations on the fault blocks corresponding to the stripe block state mapping items.

20 Claims, 7 Drawing Sheets

(56) References Cited

U.S. PATENT DOCUMENTS

| | | |
|---|---|---|
| 2006/0085674 A1 | 4/2006 | Ananthamurthy |
| 2008/0126833 A1 | 5/2008 | Callaway et al. |
| 2008/0244585 A1 | 10/2008 | Candea et al. |
| 2009/0158079 A1 | 6/2009 | Chung et al. |
| 2013/0173955 A1 | 7/2013 | Hallak et al. |
| 2016/0011935 A1* | 1/2016 | Luby ................ G06F 9/505 |
| | | 714/6.2 |
| 2017/0244594 A1 | 8/2017 | Shiota et al. |
| 2017/0270018 A1 | 9/2017 | Xiao et al. |
| 2017/0315879 A1* | 11/2017 | Park ................ G06F 11/1469 |
| 2018/0032407 A1 | 2/2018 | Wu et al. |
| 2018/0357554 A1 | 12/2018 | Hazan et al. |
| 2021/0079326 A1 | 3/2021 | Bennett et al. |
| 2021/0326206 A1 | 10/2021 | Shatsky |
| 2022/0058086 A1* | 2/2022 | Park ................ G06F 11/0772 |

FOREIGN PATENT DOCUMENTS

| | | | |
|---|---|---|---|
| CN | 107636617 A | | 1/2018 |
| CN | 108368546 A | * 8/2018 | ............ C12Q 1/686 |
| CN | 109542645 A | | 3/2019 |
| CN | 111124262 A | | 5/2020 |
| CN | 113168569 A | | 7/2021 |
| CN | 113986149 A | | 1/2022 |
| JP | H1124851 A | | 1/1999 |

OTHER PUBLICATIONS

PCT/CN2022/098944, Written Opinion, Date Mailed Aug. 31, 2022.
First Office Action of corresponding CN priority application (CN202111607788.9) Feb. 11, 2022.
Second Office Action of corresponding CN priority application (CN202111607788.9) Feb. 28, 2022.
Notification to Grant Patent Right for Invention of corresponding CN priority application (CN202111607788.9) Mar. 16, 2022.

* cited by examiner

| Stripe serial number | Position serial number | Error type | IO type | IO data information |
|---|---|---|---|---|

SYSTEM FAULT HANDLING METHOD AND APPARATUS, DEVICE, AND STORAGE MEDIUM

This application claims priority to Chinese Patent Application No. 202111607788.9, filed on Dec. 27, 2021 in China National Intellectual Property Administration and entitled "System Fault Handling Method and Apparatus, Device, and Storage Medium", which is hereby incorporated by reference in its entirety.

FIELD

The present application relates to the technical field of cloud computing data centers, and in particular to a system fault handling method and apparatus, a device, and a storage medium.

BACKGROUND

In a cloud computing data center, the performance of data storage is a core problem that a user is concerned about. Redundant arrays of independent disks (RAID) of a storage system are divided according to stripes, and stripes of the RAID are divided into blocks according to various disks. Nowadays, there are often temporary faults such as input/output (IO) request response timeouts, errors, or short-time offline of the disks due to the very busy business of the RAID. The RAID often uses various complex mechanisms such as slow disks, bad blocks, and reconstruction to deal with corresponding fault scenarios, which will cause IO requests to be frequently retried, delay completion, or report errors. In severe cases, it will lead to degradation, offline, and other faults of the RAID, resulting in business interruption. However, in most cases, temporary faults are very brief and can be quickly restored to normal. Directly handling the faults according to various complex mechanisms such as the slow disks, the bad blocks, and the reconstruction will only cause frequent faults of the RAID and lead to degradation, offline, rapid IO performance degradation, and even business interruption of the RAID. In the mechanism of the bad blocks, it is necessary to select a corresponding block on the same disk as a recovery block for mapping, and an original block is recorded as a bad block. If IO failures are caused by the busy business or the temporary faults of the disks, this method will result in the recovery block continuing to fail, and exacerbating the busyness or the number of the fault errors of the corresponding disk. Additionally, it is easy to misjudge a good disk block as a bad block.

Over time, it will reduce the capacities of the disk and the RAID, consequently shortening the service life of the RAID.

SUMMARY

The present application relates to a system fault handling method and apparatus, a device, and a storage medium. The method is as follows:

in a first aspect, the present application discloses the system fault handling method, applied to a redundant array of independent disks (RAID), including:
dividing disks in the RAID based on the number of stripes, to enable blocks with the same number as the disks to exist on each stripe, then configuring multi-state standby blocks for the stripes, and distributing the multi-state standby blocks on the disks in the RAID, so as to enable the disks to use the multi-state standby blocks to run at the same time to handle faults when the faults occur at the same time;
acquiring fault information factors corresponding to fault blocks after faults occur on the blocks, and then storing the fault information factors in stripe block state mapping items in a stripe block state mapping linked list; and
selecting corresponding handling strategies based on different stripe block state mapping items, so as to perform fault handling operations on the fault blocks corresponding to the stripe block state mapping items by using the handling strategies.

In some implementations, dividing the disks in the RAID based on the number of stripes, to enable the blocks with the same number as the disks to exist on each stripe, and then configuring the multi-state standby block for the stripes include:
dividing the disks in the RAID based on the number of stripes, to enable blocks with the same number as the disks to exist on each stripe; and
configuring the blocks with a preset number as the multi-state standby blocks.

In some implementations, distributing the multi-state standby blocks on the disks in the RAID, so as to enable the disks to use the multi-state standby blocks to run at the same time to handle faults when the faults occur at the same time, includes:
acquiring a current stripe serial number and the number of the disks in the RAID firstly, where the stripe serial number is an incrementing first serial number set for the stripes according to a first preset order;
determining position information of the current multi-state standby block based on the current stripe serial number and the number of the disks and according to a preset position computing rule; and
distributing the multi-state standby blocks on the disks in the RAID, so as to enable the disks to use the multi-state standby blocks to run at the same time to handle the faults when the faults occur at the same time.

In some implementations, acquiring the fault information factors corresponding to the fault blocks after faults occur on the blocks, and then storing the fault information factors in stripe block state mapping items in the stripe block state mapping linked list, include:
acquiring stripe serial numbers, position serial numbers, error types, IO types, and IO data information corresponding to the fault blocks after faults occur on the blocks, where each position serial number is a second serial number set for each block according to a second preset order; and
storing the stripe serial numbers, the position serial numbers, the error types, the IO types and the IO data information in the stripe block state mapping items in the stripe block state mapping linked list according to a preset storage rule.

In some implementations, selecting the corresponding handling strategies based on different stripe block state mapping items, so as to perform fault handling operations on the fault blocks corresponding to the stripe block state mapping items by using the handling strategies, include:
determining the corresponding error types based on the stripe block state mapping items; and
determining the corresponding handling strategies based on the error types, and then performing the fault handling operations on the fault blocks corresponding to the stripe block state mapping items by using the handling strategies.

In some implementations, after selecting corresponding handling strategies based on different stripe block state mapping items, so as to perform the fault handling operations on the fault blocks corresponding to the stripe block state mapping items by using the handling strategies, the method further includes:

determining whether to delete the stripe block state mapping items and/or enter corresponding fault handling flows based on the error types in the stripe block state mapping items.

In some implementations, before selecting corresponding handling strategies based on different stripe block state mapping items, so as to perform the fault handling operations on the fault blocks corresponding to the stripe block state mapping items by using the handling strategies, the method further includes:

setting a timing program for the block state mapping linked list, so as to perform the corresponding fault handling operations on the stripe block state mapping items according to a preset time period.

In a second aspect, the present application discloses a system fault handling apparatus, including:

a disk dividing module, configured for dividing the disks in a RAID based on the number of stripes, to enable blocks with the same number as the disks to exist on each stripe;

a standby block configuring module, configured for configuring a multi-state standby block for the stripes;

a standby block distributing module, configured for distributing the multi-state standby blocks on the disks in the RAID, so as to enable the disks to use the multi-state standby blocks to run at the same time to handle faults when the faults occur at the same time;

an information acquiring module, configured for acquiring fault information factors corresponding to the fault blocks after faults occur on the blocks;

an information storage module, configured for storing the fault information factors in stripe block state mapping items in a stripe block state mapping linked list; and a fault handling module, configured for selecting corresponding handling strategies based on different stripe block state mapping items, so as to perform the fault handling operations on the fault blocks corresponding to the stripe block state mapping items by using the handling strategies.

In a third aspect, the present application discloses an electronic device, including: a memory, configured for storing computer programs; and a processor, configured for executing the computer programs to implement steps of the foregoing disclosed system fault handling method.

In a fourth aspect, the present application discloses a computer-readable storage medium, configured for storing computer programs, where when the computer programs are executed by a processor, the foregoing disclosed system fault handling method is implemented.

BRIEF DESCRIPTION OF THE DRAWINGS

To describe a technical solution in embodiments of the present application or in the prior art more clearly, the following brief introduces the accompanying drawings for describing the embodiments or the prior art. Apparently, the accompanying drawings in the following description show merely embodiments of the present application. Those of ordinary skill in the art may derive other accompanying drawings from the accompanying drawings without creative efforts.

DETAILED DESCRIPTION

The technical solutions in embodiments of the present application are clearly and completely described below in combination with the accompanying drawings in the embodiments of the present application. Apparently, the embodiments described are merely a part rather than all of the embodiments of the present application. All other embodiments obtained by those of ordinary skilled in the art based on the embodiments of the present application without making creative efforts shall fall within the scope of protection of the present application.

At present, temporary faults such as IO request response timeouts, errors, or short-time offline of disks due to very busy business of RAID often occur. However, directly handling the faults according to various complex mechanisms such as the slow disks, the bad blocks, and the reconstruction will only cause frequent faults of the RAID and lead to degradation, offline, rapid IO performance degradation, even business interruption of the RAID. In view of this, the present application provides a system fault handling method, capable of storing fault information of all fault blocks in a stripe block state mapping linked list, and then selecting the corresponding handling strategies according to the fault information to perform accurate fault handling operations on all the fault blocks. Therefore, the fault handling performance of a system is optimized, delays of the stripes are reduced, a bandwidth of the data is increased, and overall performance of a storage system is improved.

Figure 1:
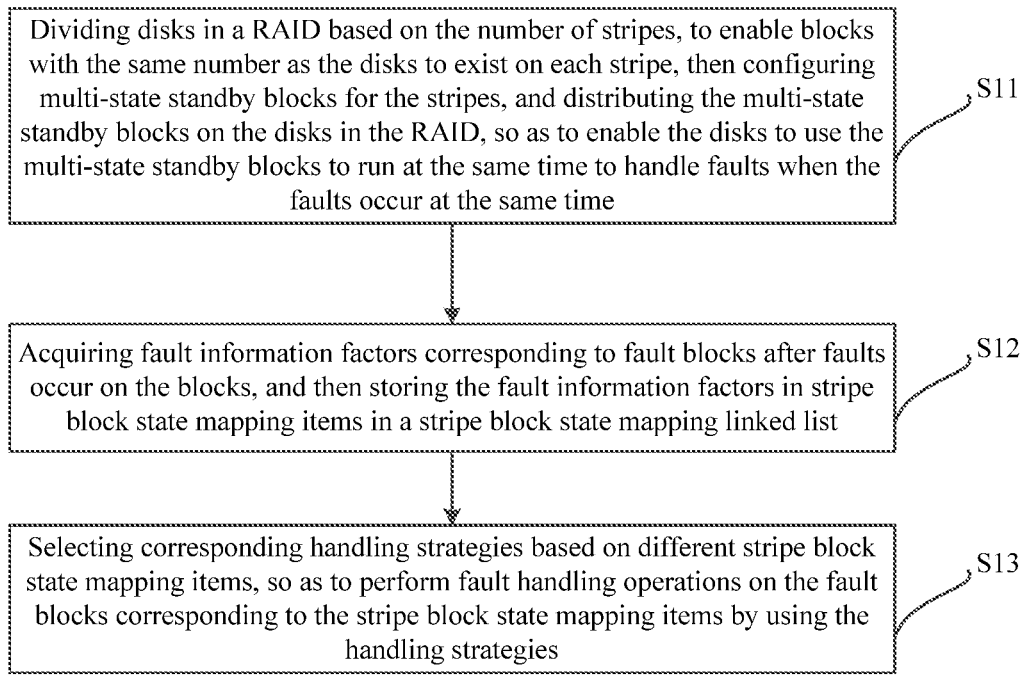
FIG. 1 is a flowchart of a system fault handling method disclosed by the present application.

One or more embodiments of the present application disclose the system fault handling method, referring to FIG. 1, and the method includes:

Step S11: the disks in the RAID are divided based on the number of stripes, to enable blocks with the same number as the disks to exist on each stripe, then multi-state standby blocks are configured for the stripes, and the multi-state standby blocks are distributed on the disks in the RAID, so as to enable the disks to use the multi-state standby blocks to run at the same time to handle faults when the faults occur at the same time.

Figure 2:
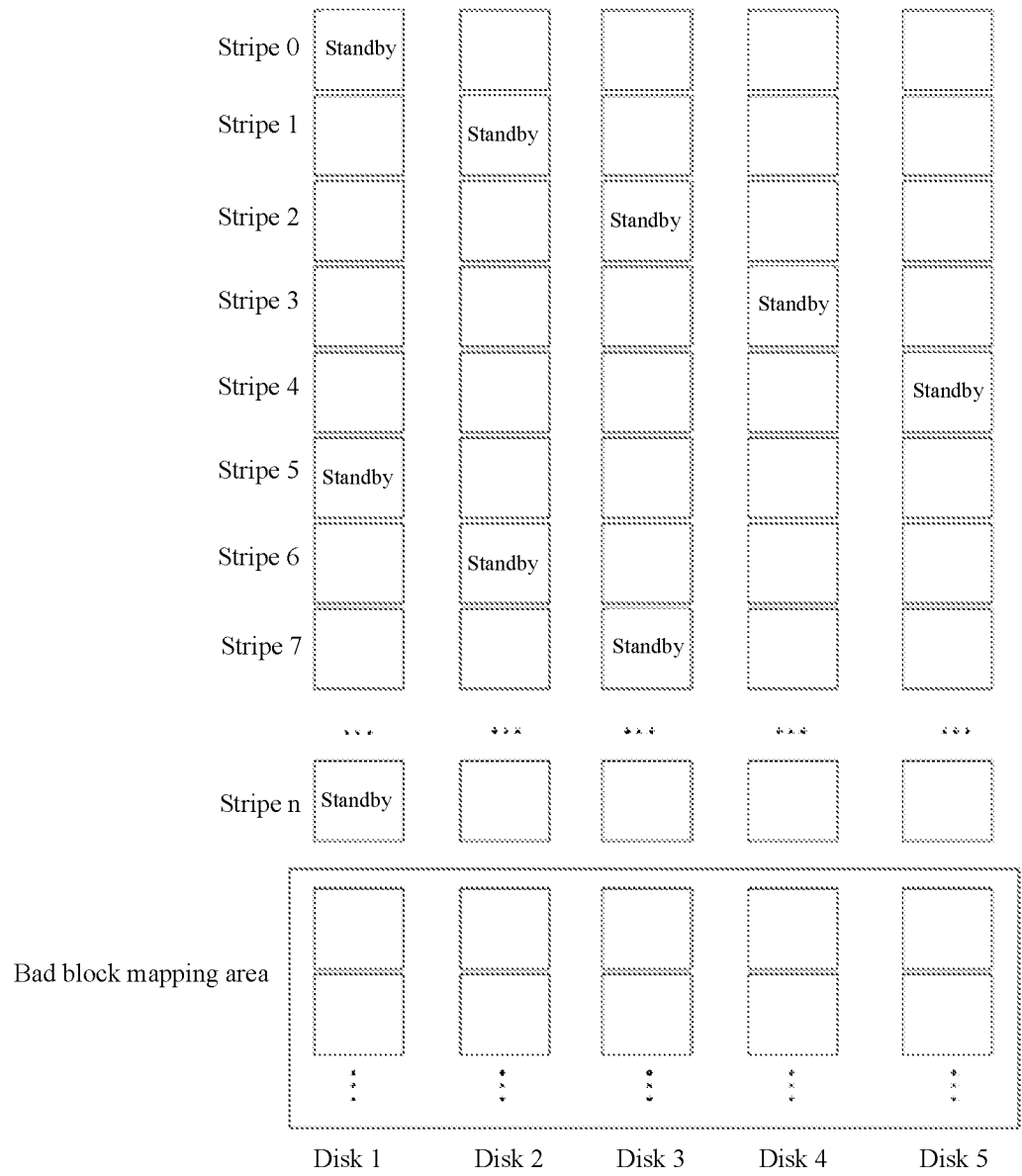
FIG. 2 is a schematic diagram showing division of stripes in a RAID and configuration of standby blocks provided by the present application.

In the embodiment, the disks in the RAID are divided based on the number of stripes, to enable blocks with the same number as the disks to exist on each stripe, and then the blocks with the preset number are configured as the multi-state standby blocks. It can be understood that continuous data is divided into data blocks in a same size by the stripes, and data of each segment is written to different disks in the RAID. As shown in FIG. 2, the RAID in the figure contains five disks; each stripe contains four blocks and a standby block; and each standby block serves as a fault standby block of a corresponding stripe. It can be understood that all the disks in the RAID are divided into data blocks in a same size by the stripes, whereby a number of the data blocks is a product of the number of the stripes and the number of the disks. In addition, a bad block mapping area will be set in the RAID, and the number of the data blocks in the bad block mapping area is a self-defined number. Then, the multi-state standby blocks are configured for the stripes, and distributed on the disks in the RAID. Besides, the standby blocks of adjacent stripes are not on a same disk, whereby when a large number of faults occur at the same time, the standby blocks on different disks can be operated at the same time, to make the plurality of disks work at the same time, which quickly handles the faults and optimizes the performance of the system.

Step S12: fault information factors corresponding to the fault blocks are acquired after faults occur on the blocks, and then the fault information factors are stored in stripe block state mapping items in the stripe block state mapping linked list.

In one or more embodiments of the present application, the fault information factors corresponding to the fault blocks are acquired after faults occur on the blocks, and then the fault information factors are stored in the stripe block state mapping items in the stripe block state mapping linked list. It can be understood that the fault information factors are stored in stripe block state mapping items in the stripe block state mapping linked list, for facilitating centralized handling of the faults.

Step S13: the corresponding handling strategies are selected based on different stripe block state mapping items, so as to perform the fault handling operations on the fault blocks corresponding to the stripe block state mapping items by using the handling strategies.

In one or more embodiments of the present application, after the fault information factors are stored in the stripe block state mapping items in the stripe block state mapping linked list, information in the strip block state mapping items is acquired; and the corresponding handling strategies are selected according to the information, so as to perform the fault handling operations on the fault blocks corresponding to the stripe block state mapping items by using the handling strategies. It should be pointed out that the plurality of stripe block state mapping items can be stored in the stripe block state mapping linked list.

In some implementations, by configuring the multi-state standby block for each stripe, when faults occur at the same time, the multi-state standby blocks are configured for running at the same time to handle the faults; and after faults occur on the blocks, the fault information of all the fault blocks is stored in the stripe block state mapping linked list, whereby the corresponding handling strategies are selected according to the fault information to perform accurate fault handling operations on all the fault blocks. Therefore, the fault handling performance of a system is optimized, delays of the stripes are reduced, a bandwidth of the data is increased, and overall performance of a storage system is improved.

Figure 3:
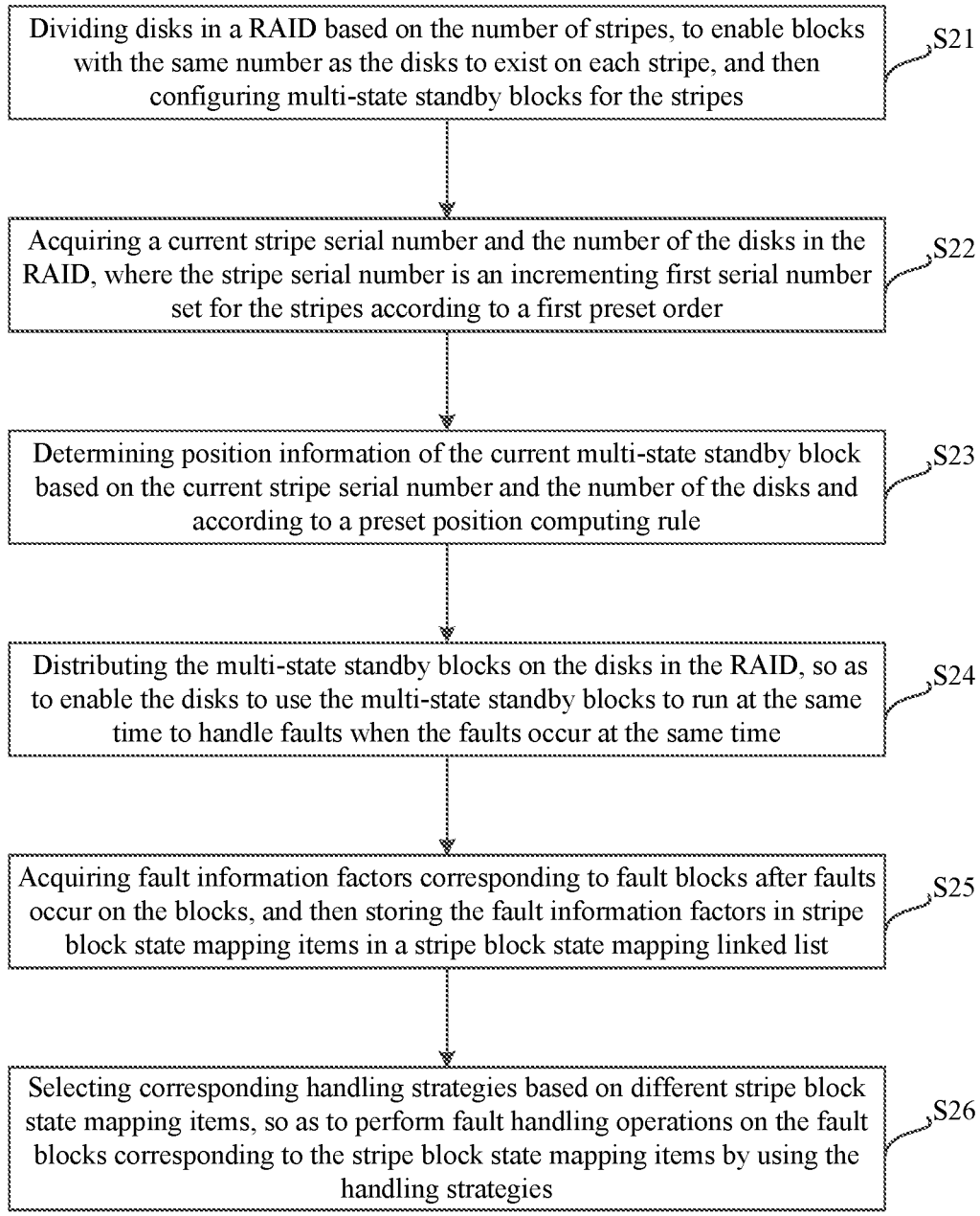
FIG. 3 is a flowchart of the specific system fault handling method disclosed by the present application.

Referring to FIG. 3, one or more embodiments of the present application disclose a system fault handling method.

Step S21: the disks in the RAID are divided based on the number of the stripes, to enable the blocks with the same number as the disks to exist on each stripe, and then the multi-state standby blocks are configured for the stripes.

Step S22: a current stripe serial number and the number of the disks in the RAID are acquired firstly, where the stripe serial number is an incrementing first serial number set for the stripes according to a first preset order.

In the embodiment, the current stripe serial number and the number of the disks in the RAID are acquired after the multi-state standby block is configured for the stripes. It can be understood that the stripe serial number is an incrementing first serial number set for the stripes according to the first preset order. For example, as shown in FIG. 1, a serial number of the first stripe is configured as 0, and subsequently incremented with an incremental difference being 1. Besides, 5 disks are set in the current RAID.

Step S23: the position information of the current multi-state standby block is determined based on the current stripe serial number and the number of the disks, and according to a preset position computing rule.

In the embodiment, after the current stripe serial number and the number of the disks in the RAID are acquired, the position information of the current multi-state standby block is determined based on the current stripe serial number and the number of the disks, and according to the preset position computing rule. It can be understood that the preset position computing rule is the stripe serial number % the number of the disks, that is, a remainder is determined as the position information of the current multi-state standby block. For example, as shown in FIG. 2, when the stripe serial number is 0, a result can be computed to be 0 by the stripe serial number % the number of the disks. Therefore, the position information of the multi-state standby block on the stripe with the stripe serial number of 0 is 0. It should be pointed out that the position information is 0 at this time, indicating that the current multi-state standby block is located on the disk 1. If the position information is 1, it is indicated that the current multi-state standby block is located on the disk 2. That is, the number of the position information plus 1 is the number of the disks on which the current multi-state standby block is located.

Step S24: the multi-state standby blocks are distributed on the disks in the RAID, so as to enable the disks to use the multi-state standby blocks to run at the same time to handle faults when the faults occur at the same time.

In one or more embodiments of the present application, the multi-state standby blocks are distributed on the disks in the RAID according to the computed position information of the current multi-state standby block, so as to enable the disks to use the multi-state standby blocks to run at the same time to handle faults when the faults occur at the same time. It can be understood that the multi-state standby blocks are distributed on the disks in the RAID according to the computed position information of the current multi-state standby block, so as to ensure that the multi-state standby blocks on the adjacent stripes are not on the same disk.

Step S25: the fault information factors corresponding to the fault blocks is acquired after faults occur on the blocks, and then the fault information factors are stored in stripe block state mapping items in the stripe block state mapping linked list.

Step S26: the corresponding handling strategies are selected based on different stripe block state mapping items, so as to perform the fault handling operations on the fault blocks corresponding to the stripe block state mapping items by using the handling strategies.

The specific contents of the above steps S21, S25 and S26 may refer to corresponding contents disclosed in the foregoing embodiments, which will not be detailed here.

In one or more embodiments of the present application, during distribution of the multi-state standby blocks on the disks in the RAID, the current stripe serial number and the number of the disks in the RAID are acquired firstly; then, the position information of the current multi-state standby block is determined based on the current stripe serial number and the number of the disks, and according to the preset position computing rule; and finally, the multi-state standby blocks are distributed on the disks in the RAID according to the position information, whereby when faults occur at the same time, the disks can operate the multi-state standby blocks on different disks at the same time, whereby a plurality of disks work at the same time, which quickly handles the faults and optimizes the performance of the system.

Figure 4:
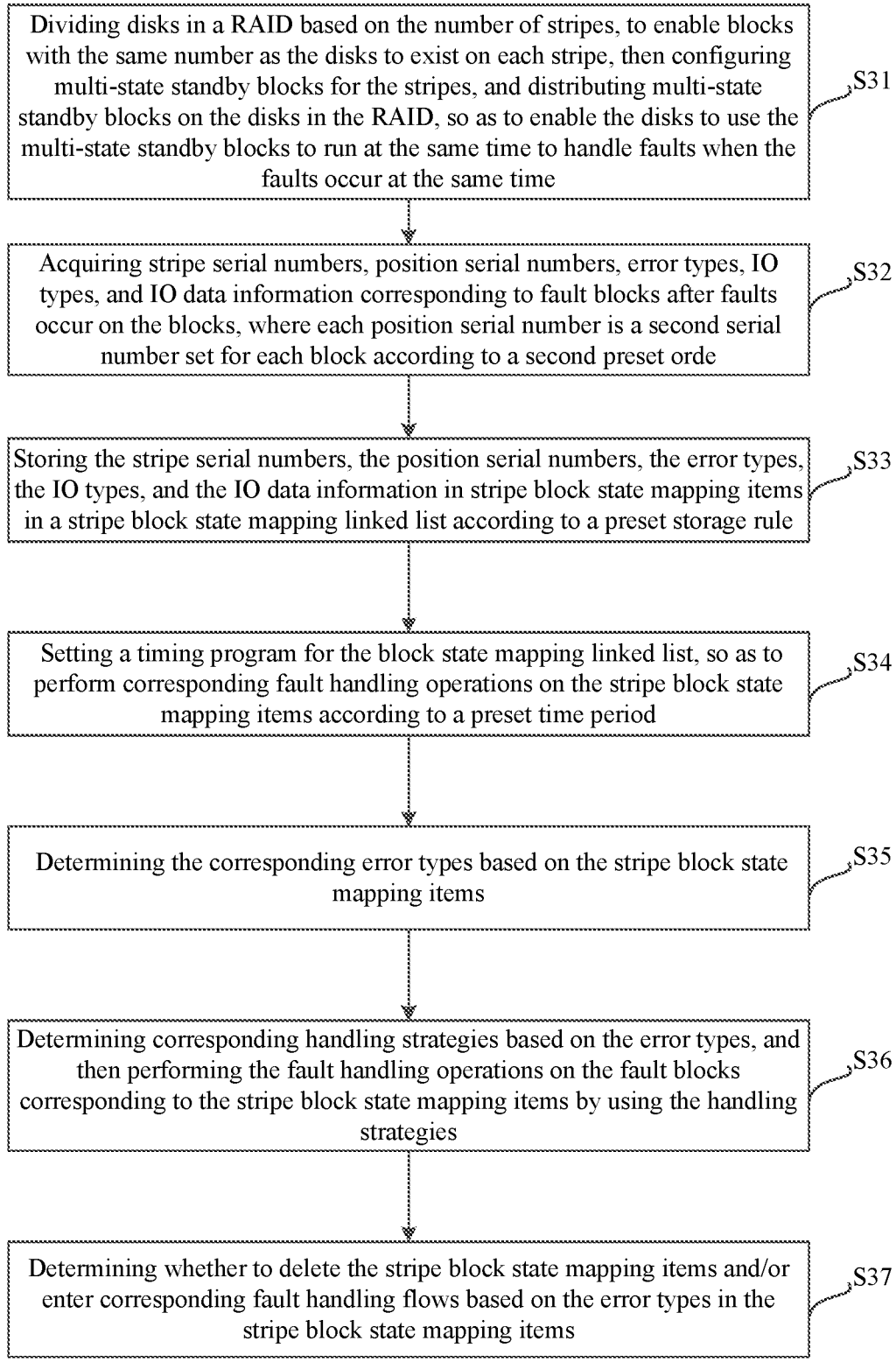
FIG. 4 is a flowchart of the specific system fault handling method disclosed by the present application.

Referring to FIG. 4, one or more embodiments of the present application disclose the system fault handling method.

Step S31: the disks in the RAID are divided based on the number of stripes, to enable blocks with the same number as the disks to exist on each stripe, then multi-state standby blocks are configured for the stripes, and the multi-state standby blocks are distributed on the disks in the RAID, so as to enable the disks to use the multi-state standby blocks to run at the same time to handle faults when the faults occur at the same time.

Step S32: stripe serial numbers, position serial numbers, error types, IO types and IO data information corresponding to the fault blocks are acquired after faults occur on the blocks, where each position serial number is a second serial number set for each block according to a second preset order.

In the embodiment, the stripe serial numbers, the position serial numbers, the error types, the IO types and the IO data information corresponding to the fault blocks are acquired after faults occur on the blocks. It can be understood that the position serial number is the number of the disks on which the fault block is located. IO data information is configured for recording an initial address, a data length and other information of IO data.

Step S33: the stripe serial numbers, the position serial numbers, the error types, the IO types and the IO data information are stored in the stripe block state mapping items in the stripe block state mapping linked list according to a preset storage rule.

Figures 5, 6:
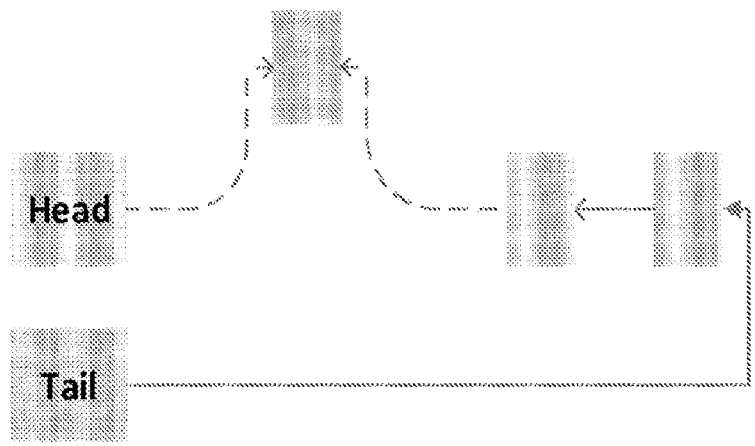
FIG. 5 is a schematic diagram of stripe block state mapping items provided by the present application.
FIG. 6 is a schematic diagram of a stripe block state mapping linked list provided by the present application.

In one or more embodiments of the present application, the stripe serial numbers, the position serial numbers, the error types, the IO types and the IO data information are stored in the stripe block state mapping items in the stripe block state mapping linked list according to a preset storage rule. It can be understood that as shown in FIG. 5, the stripe serial number, the position serial number, the error type, the IO type and the IO data information are combined to obtain the stripe block state mapping items. Then, the stripe block state mapping items are stored in the stripe block state mapping linked list according to a preset storage rule. As shown in FIG. 6, the stripe block state mapping items are put in a head of the stripe block state mapping linked list in the RAID. It can be understood that the stripe block state mapping items are put in the head of the stripe block state mapping linked list in the RAID, to make the stripe block state mapping items put in the stripe block state mapping linked list be in a certain order, whereby when corresponding handling operations are performed on the stripe block state mapping items from a tail of the stripe block state mapping linked list, handling is performed in a putting order of the stripe block state mapping items.

Step S34: a timing program is set for the block state mapping linked list, so as to perform the corresponding fault handling operations on the stripe block state mapping items according to a preset time period.

In one or more embodiments of the present application, the timing program is set for the block state mapping linked list, so as to perform the corresponding fault handling operations on the stripe block state mapping items according to the preset time period. It can be understood that a timing program is set for the block state mapping linked list, and the stripe block state mapping linked list is handled regularly by the timing program.

Step S35: the corresponding error types are determined based on the stripe block state mapping items.

In one or more embodiments of the present application, the corresponding error types are determined based on the stripe block state mapping items. It can be understood that the error types contain TIMEOUT (timeout), BADBLOCK (bad block), OFFLINE (offline) and other error states. The IO types are configured for recording whether it is a read IO type or a write IO type.

Step S36: the corresponding handling strategies are determined based on the error types, and then the fault handling operations are performed on the fault blocks corresponding to the stripe block state mapping items by using the handling strategies.

In one or more embodiments of the present application, based on the error types, the corresponding handling strategies are determined, that is, it is necessary to use different handling strategies for different error types of different IO types. For example, when the IO type is the write IO type, a handling flow is as follows:

when write data of the block is wrong, write IO data is firstly written to the multi-state standby block, and the current stripe block state mapping item is inserted into the corresponding block state mapping linked list. If the data is successfully written to the standby block, return is successful. If the data fails to be written to the standby block, the current error type is updated to the stripe block state mapping item. Then, the stripe block state mapping linked list is handled regularly by the timing program. When the stripe block state mapping item is handled, the different handling strategies are adopted according to the error types of the error IO types.

It can be understood that when the error type is the TIMEOUT error type, IO type data stored in the standby block is written to the corresponding block. When the error type is the BADBLOCK error type, the IO type data stored in the standby block is written to the corresponding block. When the error type is the OFFLINE error type, whether the disk is in offline is queried.

It should be pointed out that when a timing handler handles the stripe block state mapping linked list again, and when a certain list item is in TIMEOUT and three times of errors occur, whether the disk is in offline is queried.

When the IO type is a read IO type, a handling flow is as follows:

if it is a block read timeout error, the block is read again for retry; and if it is successful, data is returned, and the flow ends. If the read is still in timeout, after three times of timeout, a step of reading the data of other blocks of the stripe and reconstructing data of the fault blocks is entered. If reconstruction fails, a read error is returned, and the flow ends. If reconstruction is successful, read data is returned to a user, and the reconstructed block data is written to the standby block; and then the stripe block state mapping linked list is handled regularly by the timing program. When the stripe block state mapping item is handled, the block data stored in the standby block is written to the corresponding block. If there are still errors, error counting is performed, and a next stripe block state mapping item is handled. It should be pointed out that when three times of errors occur for the timing handler during regularly handling the list item, whether the disk is in offline is queried.

Step S37: whether to delete the stripe block state mapping items and/or enter corresponding fault handling flows is determined based on the error types in the stripe block state mapping items.

In the embodiment, whether to delete the stripe block state mapping items and/or enter corresponding fault handling flows is determined based on the error types in the stripe block state mapping items. For example, when the IO type is the write IO type:

when the error type is the TIMEOUT error type, after the IO type data stored in the multi-state standby block is written to the corresponding block, and if the data is successfully written, the stripe block state mapping item is deleted, and the flow ends. When the error type is the BADBLOCK error type, after the IO type data stored in the multi-state standby block is written to the corresponding block, and if the data is successfully written, the stripe block state mapping item is deleted, and the flow ends; and if the errors still occur, the stripe block state mapping item is deleted, and a bad block handling flow is entered. When the error type is the OFFLINE error type, the stripe block state mapping item is directly deleted, and whether the disk is in offline is queried; if the disk is in offline, a reconstruction flow is entered; and if the disk is not in offline, the bad block handling flow is entered.

When the IO type is the read IO type:

when the stripe block state mapping linked list is handled regularly by the timing program, and the stripe block state mapping item is handled, if the step of writing block data stored in the multi-state standby block to the corresponding block is successful, the strip block state mapping item is deleted. When three times of errors occur for the timing handler during regularly handling the list item, whether the disk is in offline is queried; if the disk is in offline, the disk offline error is reported, and the reconstruction flow and other flows are entered; otherwise, it will be transferred to the bad block handling flow.

The specific content of the above step S31 may refer to the corresponding contents disclosed in the foregoing embodiments, which will not be detailed here.

In one or more embodiments of the present application, the fault information factors corresponding to the fault blocks are acquired after faults occur on the blocks, and then the fault information factors are stored in the stripe block state mapping items in the stripe block state mapping linked list. Then, corresponding handling strategies are selected based on different stripe block state mapping items, so as to perform the fault handling operations on the fault blocks by using the fault handling strategies. After the fault handling operations are finished, whether to delete the stripe block state mapping items and/or enter corresponding fault handling flows is determined based on the error types in the stripe block state mapping items. Therefore, the fault handling performance of a system is optimized, delays of the stripes are reduced, a bandwidth of the data is increased, and overall performance of a storage system is improved.

Figure 7:
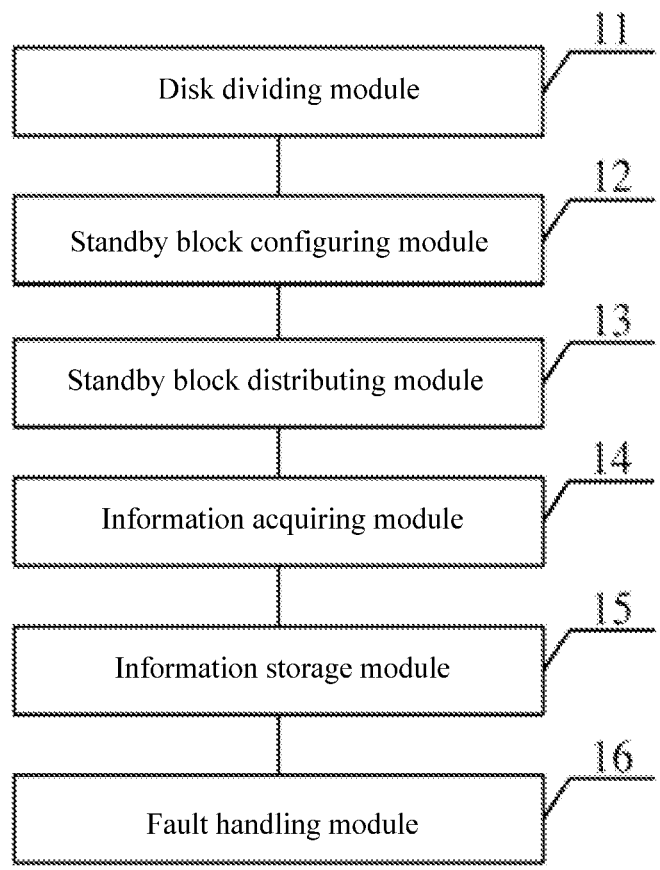
FIG. 7 is a schematic structural diagram of a system fault handling apparatus provided by the present application.

Referring to FIG. 7, one or more embodiments of the present application further correspondingly disclose the system fault handling apparatus, including:

a disk dividing module 11, configured for dividing the disks in the RAID based on the number of stripes, to enable blocks with the same number as the disks to exist on each stripe;

a standby block configuring module 12, configured for configuring the multi-state standby block for the stripes;

a standby block distributing module 13, configured for distributing the multi-state standby blocks on the disks in the RAID, so as to enable the disks to use the multi-state standby blocks to run at the same time to handle faults when the faults occur at the same time;

an information acquiring module 14, configured for acquiring the fault information factors corresponding to the fault blocks after faults occur on the blocks;

an information storage module 15, configured for storing the fault information factors in the stripe block state mapping items in the stripe block state mapping linked list; and a fault handling module 16, configured for selecting corresponding handling strategies based on different stripe block state mapping items, so as to perform the fault handling operations on the fault blocks corresponding to the stripe block state mapping items by using the handling strategies.

In some specific embodiments, the standby block distributing module 13 specifically includes:

a serial number and disk number acquiring unit, configured for acquiring the current stripe serial number and the number of the disks in the RAID firstly, where the stripe serial number is an incrementing first serial number set for the stripes according to the first preset order;

a position information computing unit, configured for determining the position information of the current multi-state standby block based on the current stripe serial number and the number of the disks and according to the preset position computing rule; and a standby block distributing unit, configured for distributing the multi-state standby blocks on the disks in the RAID, so as to enable the disks to use the multi-state standby blocks to run at the same time to handle faults when the faults occur at the same time.

Figure 8:
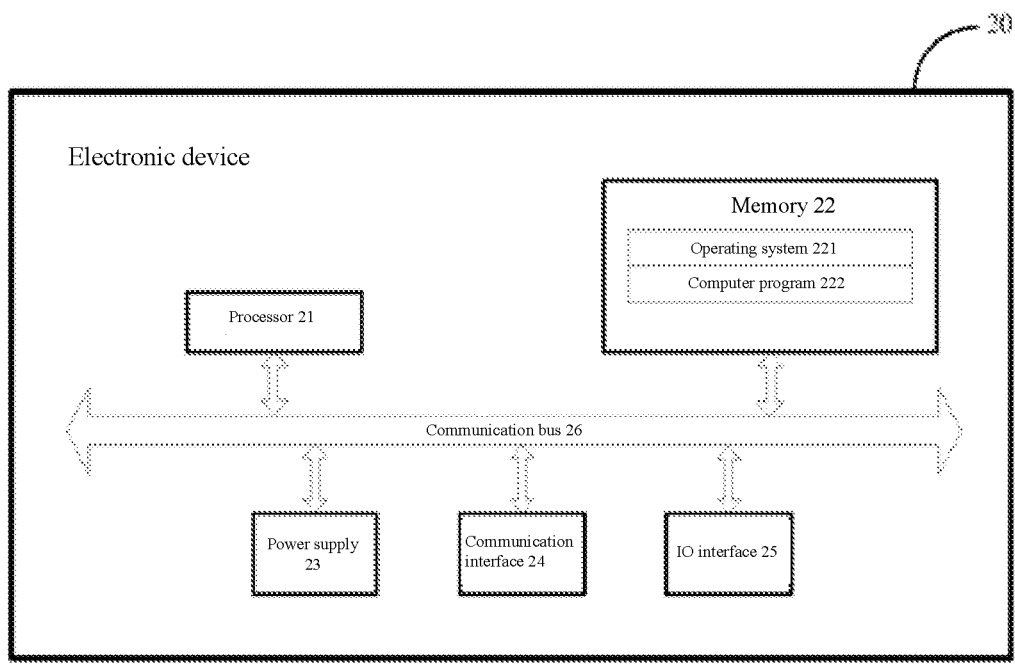
FIG. 8 is a structural diagram of an electronic device provided by the present application.

Further, one or more embodiments of the present application further provide an electronic device. FIG. 8 is a structural diagram of the electronic device 20 shown according to an exemplary embodiment. The content in the FIG. 8 cannot be considered as any restriction on the scope of use of the present application.

FIG. 8 is a schematic structural diagram of the electronic device 20 provided by one or more embodiments of the present application. The electronic device 20 can specifically include at least one processor 21, at least one memory 22, a power supply 23, a communication interface 24, an IO interface 25, and a communication bus 26, where the memory 22 is configured for storing computer programs which are loaded and executed by the processor 21 to implement relevant steps in the system fault handling method disclosed in any one of the foregoing embodiments. In addition, the electronic device 20 in the embodiment can specifically be an electronic computer.

In the embodiment, the power supply 23 is configured for supplying a working voltage for each hardware device on the electronic device 20. The communication interface 24 can create a data transmission channel between the electronic device 20 and an outside device; and a communication protocol that the communication interface follows is any communication protocol that can be applied to the technical solution of the present application, which is not specifically limited here. The IO interface 25 is configured for acquiring outside input data or output data to the outside; and a specific interface type can be selected according to a specific application demand, which will not be specifically limited here.

In addition, as a carrier for resource storage, the memory 22 may be a read-only memory, a random memory, a disk, an optical disk, etc. Resources stored on the memory can include an operating system 221, computer programs 222, etc. A storage manner can be short-time storage or permanent storage, where the operating system 221 is configured for managing and controlling various hardware devices on the electronic device 20 and the computer programs 222 which may be Windows Server, Netware, Unix, Linux, etc. The computer programs 222 not only include the computer programs that can be configured for completing the system fault handling method executed by the electronic device 20 disclosed in any one of the foregoing embodiments, but also can further include computer programs that can be configured for completing other specific tasks.

Further, one or more embodiments of the present application further disclose a storage medium, in which the computer programs are stored. When the computer programs are loaded and executed by the processor, steps of the system fault handling method disclosed in any one of the foregoing embodiments are implemented.

Each embodiment of the description is described in a progressive manner, each embodiment focuses on differences from other embodiments, and the same or similar parts between the embodiments may refer to each other. With regard to the apparatus disclosed in the embodiments, as corresponding to the methods disclosed in the embodiments, the systems are relatively and simply described, and relevance may just refer to partial description of the method.

Finally, it should be further noted that relational terms herein such as first and second are only used to distinguish one entity or operation from another entity or operation without necessarily requiring or implying any actual such relationship or order between such entities or operations. Furthermore, terms "include", "contain", or any other variations thereof are intended to cover non-exclusive inclusions, such that a process, a method, an article, or a device including a series of elements not only includes those elements, but also includes other elements that are not explicitly listed, or further includes inherent elements of the process, the method, the article, or the device. In the case of no more limitations, the element limited by the sentence "including a . . . " does not exclude the situation that other same elements also exist in the process, the method, the article or the device including the element.

The system fault handling method and apparatus, the device and the storage medium provided by the present application are introduced in detail above. In the description, particular examples are used for illustration of principles and implementations of the present application. The description of the above embodiments is only used to help understand the method and core ideas of the present application. In addition, those of ordinary skilled in the art can make any modification in terms of particular implementations and the scope of application according to the ideas of the present application. To sum up, the content of the description should not be understood as limiting to the present application.

What is claimed is:

1. A system fault handling method, applied to a redundant array of independent disks (RAID), comprising:
   dividing disks in the RAID based on a number of stripes, to enable blocks with a same number as the disks to exist on each stripe, then configuring multi-state standby blocks for the stripes, and distributing the multi-state standby blocks on the disks in the RAID, so as to enable the disks to use the multi-state standby blocks to run at a same time to handle faults when the faults occur at the same time;
   acquiring fault information factors corresponding to fault blocks after the faults occur on the blocks, and then storing the fault information factors in stripe block state mapping items in a stripe block state mapping linked list; and
   selecting corresponding handling strategies based on different stripe block state mapping items, so as to perform fault handling operations on the fault blocks corresponding to the stripe block state mapping items by using the handling strategies; wherein before the selecting corresponding handling strategies based on different stripe block state mapping items, so as to perform fault handling operations on the fault blocks corresponding to the stripe block state mapping items by using the handling strategies, the method further comprises:
   setting a timing program for the stripe block state mapping linked list, so as to perform the corresponding fault handling operations on the stripe block state mapping items according to a preset time period.

2. The system fault handling method according to claim 1, wherein the dividing disks in the RAID based on a number of stripes, to enable blocks with a same number as the disks to exist on each stripe, then configuring multi-state standby blocks for the stripes comprises:
   dividing the disks in the RAID based on the number of stripes, to enable the blocks with the same number as the disks to exist on each stripe; and
   configuring the blocks with a preset number as the multi-state standby blocks.

3. The system fault handling method according to claim 1, wherein the distributing the multi-state standby blocks on the disks in the RAID, so as to enable the disks to use the multi-state standby blocks to run at a same time to handle faults when the faults occur at the same time comprises:
   acquiring a current stripe serial number and a number of the disks in the RAID firstly, wherein a stripe serial number is an incrementing first serial number set for the stripes according to a first preset order;
   determining position information of a current multi-state standby block based on the current stripe serial number and the number of the disks and according to a preset position computing rule; and
   distributing the multi-state standby blocks on the disks in the RAID, so as to enable the disks to use the multi-state standby blocks to run at the same time to handle the faults when the faults occur at the same time.

4. The system fault handling method according to claim 3, wherein the preset position computing rule is a remainder of the stripe serial number divided by the number of the disks.

5. The system fault handling method according to claim 3, wherein the acquiring fault information factors corresponding to fault blocks after the faults occur on the blocks, and then storing the fault information factors in stripe block state mapping items in a stripe block state mapping linked list comprises:

acquiring stripe serial numbers, position serial numbers, error types, input/output (IO) types, and IO data information corresponding to the fault blocks after the faults occur on the blocks, wherein each position serial number of the position serial numbers is a second serial number set for each block of the blocks according to a second preset order; and storing the stripe serial numbers, the position serial numbers, the error types, the IO types, and the IO data information in the stripe block state mapping items in the stripe block state mapping linked list according to a preset storage rule.

6. The system fault handling method according to claim 5, wherein each of the position serial numbers is a number of the disks on which one of the fault blocks is located.

7. The system fault handling method according to claim 5, wherein the IO data information is configured for recording an initial address and a data length.

8. The system fault handling method according to claim 5, wherein the error types comprise a timeout error type, a bad block error type and an offline error type.

9. The system fault handling method according to claim 5, wherein the IO types are configured for recording whether an IO is a read IO type or a write IO type.

10. The system fault handling method according to claim 5, wherein the selecting corresponding handling strategies based on different stripe block state mapping items, so as to perform fault handling operations on the fault blocks corresponding to the stripe block state mapping items by using the handling strategies comprises:

determining corresponding error types based on the stripe block state mapping items; and determining the corresponding handling strategies based on the corresponding error types, and then performing the fault handling operations on the fault blocks corresponding to the stripe block state mapping items by using the corresponding handling strategies.

11. The system fault handling method according to claim 10, wherein the determining the corresponding handling strategies based on the corresponding error types, and then performing the fault handling operations on the fault blocks corresponding to the stripe block state mapping items by using the corresponding handling strategies comprises:

in response to a timeout error type, writing IO type data stored in a multi-state standby block of the multi-state standby blocks to a corresponding block;

in response to a bad block error type, writing the IO type data stored in the multi-state standby block to the corresponding block; and in response to an offline error type, querying whether a corresponding disk of the disks is in offline.

12. The system fault handling method according to claim 10, wherein the determining the corresponding handling strategies based on the corresponding error types, and then performing the fault handling operations on the fault blocks corresponding to the stripe block state mapping items by using the corresponding handling strategies comprises:

in response to a block read timeout error, reading a corresponding block of the blocks again; and in response to three times of timeout, entering a step of reading data of other blocks of a corresponding stripe and reconstructing data of the fault blocks.

13. The system fault handling method according to claim 10, wherein after the selecting corresponding handling strategies based on different stripe block state mapping items, so as to perform fault handling operations on the fault blocks corresponding to the stripe block state mapping items by using the handling strategies, the method further comprises:

determining whether to at least one of delete the stripe block state mapping items or enter corresponding fault handling flows based on the error types in the stripe block state mapping items.

14. The system fault handling method according to claim 13, wherein the determining whether to at least one of delete the stripe block state mapping items or enter corresponding fault handling flows based on the error types in the stripe block state mapping items comprises:

in response to a timeout error type, writing IO type data stored in a multi-state standby block of the multi-state standby blocks to a corresponding block, in response to a data write success, deleting a corresponding stripe block state mapping item of the stripe block state mapping items;

in response to a bad block error type, writing the IO type data stored in the multi-state standby block to the corresponding block, in response to the data write success, deleting the stripe block state mapping item; and in response to an offline error type, deleting the stripe block state mapping item.

15. The system fault handling method according to claim 1, wherein a bad block mapping area is set in the RAID, and a number of data blocks in the bad block mapping area is a self-defined number.

16. The system fault handling method according to claim 1, wherein the multi-state standby blocks of adjacent stripes are not on a same disk.

17. The system fault handling method according to claim 1, wherein a plurality of the stripe block state mapping items are stored in the stripe block state mapping linked list.

18. The system fault handling method according to claim 1, wherein the stripe block state mapping items are put in a head of the stripe block state mapping linked list in the RAID.

19. An electronic device, comprising: a memory, configured for storing computer programs; and a processor, configured for executing the computer programs, wherein the processor, upon execution of the program instructions, is configured to:

divide disks in a redundant array of independent disks (RAID) based on a number of stripes, to enable blocks with a same number as the disks to exist on each stripe, then configure multi-state standby blocks for the stripes, and distribute the multi-state standby blocks on the disks in the RAID, so as to enable the disks to use the multi-state standby blocks to run at a same time to handle faults when the faults occur at the same time;

acquire fault information factors corresponding to fault blocks after the faults occur on the blocks, and then store the fault information factors in stripe block state mapping items in a stripe block state mapping linked list; and select corresponding handling strategies based on different stripe block state mapping items, so as to perform fault handling operations on the fault blocks corresponding to the stripe block state mapping items by using the handling strategies; wherein before the selecting corresponding handling strategies based on different stripe block state mapping items, so as to perform fault handling operations on the fault blocks corresponding to the stripe block state mapping items by using the handling strategies:

set a timing program for the stripe block state mapping linked list, so as to perform the corresponding fault handling operations on the stripe block state mapping items according to a preset time period.

20. A non-transitory computer-readable storage medium, being configured for storing computer programs, wherein upon execution by a processor, the computer programs are configured to cause the processor to:

divide disks in a redundant array of independent disks (RAID) based on a number of stripes, to enable blocks with a same number as the disks to exist on each stripe, then configure multi-state standby blocks for the stripes, and distribute the multi-state standby blocks on the disks in the RAID, so as to enable the disks to use the multi-state standby blocks to run at a same time to handle faults when the faults occur at the same time;

acquire fault information factors corresponding to fault blocks after the faults occur on the blocks, and then store the fault information factors in stripe block state mapping items in a stripe block state mapping linked list; and select corresponding handling strategies based on different stripe block state mapping items, so as to perform fault handling operations on the fault blocks corresponding to the stripe block state mapping items by using the handling strategies; wherein before the selecting corresponding handling strategies based on different stripe block state mapping items, so as to perform fault handling operations on the fault blocks corresponding to the stripe block state mapping items by using the handling strategies:

set a timing program for the stripe block state mapping linked list, so as to perform the corresponding fault handling operations on the stripe block state mapping items according to a preset time period.

* * * * *